US012114239B2

(12) United States Patent
Lee

(10) Patent No.: US 12,114,239 B2
(45) Date of Patent: Oct. 8, 2024

(54) APPARATUS FOR CONTROLLING SENSOR-BASED NETWORK ACCESS AND METHOD THEREFOR

(71) Applicant: SK Telecom Co., Ltd., Seoul (KR)

(72) Inventor: Dongjin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 382 days.

(21) Appl. No.: 17/702,992

(22) Filed: Mar. 24, 2022

(65) Prior Publication Data
US 2022/0217512 A1 Jul. 7, 2022

Related U.S. Application Data

(63) Continuation of application No. PCT/KR2020/013613, filed on Oct. 7, 2020.

(30) Foreign Application Priority Data

Oct. 10, 2019 (KR) .......................... 10-2019-0125255

(51) Int. Cl.
H04W 4/38 (2018.01)
H04W 4/50 (2018.01)
(Continued)

(52) U.S. Cl.
CPC ............... H04W 4/38 (2018.02); H04W 4/50 (2018.02); H04W 8/02 (2013.01); H04W 84/18 (2013.01)

(58) Field of Classification Search
CPC ........... H04W 4/38; H04W 4/50; H04W 8/02; H04W 84/18; H04W 4/70; H04W 48/02; H04W 8/205; H04W 88/18
See application file for complete search history.

(56) References Cited

U.S. PATENT DOCUMENTS 6,859,831 B1 2/2005 Gelvin et al.
2019/0045577 A1* 2/2019 Kim ...................... H04W 76/50
(Continued)

FOREIGN PATENT DOCUMENTS

EP 3 337 223 B1 12/2020
JP 2017-506027 A 2/2017
(Continued)

OTHER PUBLICATIONS

International Search Report issued on Jan. 26, 2021, for corresponding International Patent Application No. PCT/KR2020/013613, along with an English translation.
(Continued)

Primary Examiner — Jae Y Lee
(74) Attorney, Agent, or Firm — Hauptman Ham, LLP

(57) ABSTRACT

An apparatus for controlling network access includes an access and mobility management function module (AMF) and a performance management module. The AMF provides, to a user equipment (UE), information about permissible sensors supporting a sensor-based network access from among sensors possessed by the UE. The performance management module stores the permissible sensor information. Upon receiving a list of the sensors possessed by the UE from the UE, the AMF extracts, from the performance management module, the permissible sensor information including a list of the permissible sensors and a permissible condition for permitting network access through the permissible sensors.

12 Claims, 5 Drawing Sheets

(51) Int. Cl.
*H04W 8/02* (2009.01)
*H04W 84/18* (2009.01)

(56) References Cited

U.S. PATENT DOCUMENTS

| | | | | |
|---|---|---|---|---|
| 2019/0150017 | A1* | 5/2019 | Yao | H04W 16/02 |
| | | | | 370/252 |
| 2021/0409941 | A1* | 12/2021 | Rajendran | H04W 80/02 |
| 2022/0061063 | A1* | 2/2022 | Patel | H04W 72/1263 |
| 2022/0132460 | A1* | 4/2022 | Shimoda | G01S 5/021 |

FOREIGN PATENT DOCUMENTS

| | | |
|---|---|---|
| KR | 10-0760535 B1 | 9/2007 |
| KR | 10-2019-0019005 A | 2/2019 |
| WO | 2014/037049 A1 | 3/2014 |

OTHER PUBLICATIONS

Written Opinion issued on Jan. 26, 2021, for corresponding International Patent Application No. PCT/KR2020/013613.
Office Action dated Apr. 23, 2024 for corresponding Indian Patent Application No. 202227015885 (6 pages).

\* cited by examiner

APPARATUS FOR CONTROLLING SENSOR-BASED NETWORK ACCESS AND METHOD THEREFOR

CROSS-REFERENCE TO RELATED APPLICATIONS

The present application is a continuation of International Patent Application No. PCT/KR2020/013613, filed on Oct. 7, 2020, which is based upon and claims the benefit of priority to Korean Patent Application No. 10-2019-0125255, filed on Oct. 10, 2019. The disclosures of the above-listed applications are hereby incorporated by reference herein in their entirety.

TECHNICAL FIELD

The present disclosure relates to a network access technology, and more particularly, to an apparatus for controlling network access of a terminal based on a sensor of the terminal, and a method therefor.

BACKGROUND ART

In 3GPP Rel. 17, discussions on enhancements for cyber-physical control applications in vertical domains (eCAV) are being actively conducted. CAV defines very strict requirements for consumer Internet of things (cIoT), massive devices used in vertical domain/smart factories, 5G B2B factories, and the like. For example, cIoT devices in a factory need to transmit and receive data in only a specific situation. A device is required to normally enter an inactive mode, an idle mode, or a power saving mode, and change to an active mode only when necessary so as to access a network and exchange data. However, the above devices are designed to transmit and receive data anytime, anywhere, so there arises a problem in that many resources are consumed inefficiently.

SUMMARY

An object of the present disclosure is to provide an apparatus and method for controlling a network access of a user equipment, based on a sensor value measured by a sensor of the user equipment so that the user equipment can access a network only when necessary.

In order to accomplish the above object, an apparatus for controlling network access according to an embodiment of the present disclosure includes an access and mobility management function module (AMF) providing, to a user equipment (UE), information about permissible sensors supporting a sensor-based network access from among sensors possessed by the UE, and a performance management module storing the permissible sensor information, wherein the AMF is configured to, upon receiving a list of the sensors possessed by the UE from the UE, extract, from the performance management module, the permissible sensor information including a list of the permissible sensors and a permissible condition for permitting network access through the permissible sensors.

The AMF may be further configured to, upon receiving a sensor value and identification information of at least one sensor through a request message from the UE, determine whether the sensor value and the identification information of the sensor satisfy the permissible condition, and to permit an access of the UE when determining that the permissible condition is satisfied.

The permissible condition may include a sensor value in which the network access through permissible sensor is permitted.

The permissible condition may include a measurement scheme in which the permissible sensor measures a sensor value.

The AMF may transmit, to the UE, an indicator that enables the UE to operate in an idle mode in accordance with the permissible sensor information.

The apparatus may further include an application function module (AF) that performs provisioning of the permissible sensor information to the performance management module directly or through a network exposure function module (NEF).

In order to accomplish the above object, a method for controlling network access according to an embodiment of the present disclosure includes, at an access and mobility management function module (AMF), receiving a list of sensors possessed by a user equipment (UE) from the UE, at the AMF, extracting, from a performance management module, permissible sensor information that includes a list of permissible sensors supporting a sensor-based network access from among the sensors possessed by the UE and a permissible condition for permitting network access through the permissible sensors, and at the AMF, transmitting the permissible sensor information to the UE so that the sensors possessed by the UE are set in accordance with the permissible sensor information.

The method may further include, after transmitting the permissible sensor information to the UE, receiving a sensor value and identification information of at least one sensor through a request message from the UE, determining whether the sensor value and the identification information of the sensor satisfy the permissible condition, and at the AMF, permitting an access of the UE when determining that the permissible condition is satisfied.

The permissible condition may include a sensor value in which the network access through permissible sensor is permitted.

The permissible condition may include a measurement scheme in which the permissible sensor measures a sensor value.

Transmitting the permissible sensor information to the UE may include transmitting an indicator that enables the UE to operate in an idle mode in accordance with the permissible sensor information.

The method may further include, before receiving the list of sensors possessed by the UE, at an application function module (AF), performing provisioning of the permissible sensor information to the performance management module directly or through a network exposure function module (NEF).

According to the present disclosure, unnecessary resource use can be prevented by permitting the UE to access the network only when necessary through the sensor value. Moreover, a necessary service can be provided when absolutely necessary, thereby improving the reliability of the service.

DETAILED DESCRIPTION

Figure 1:
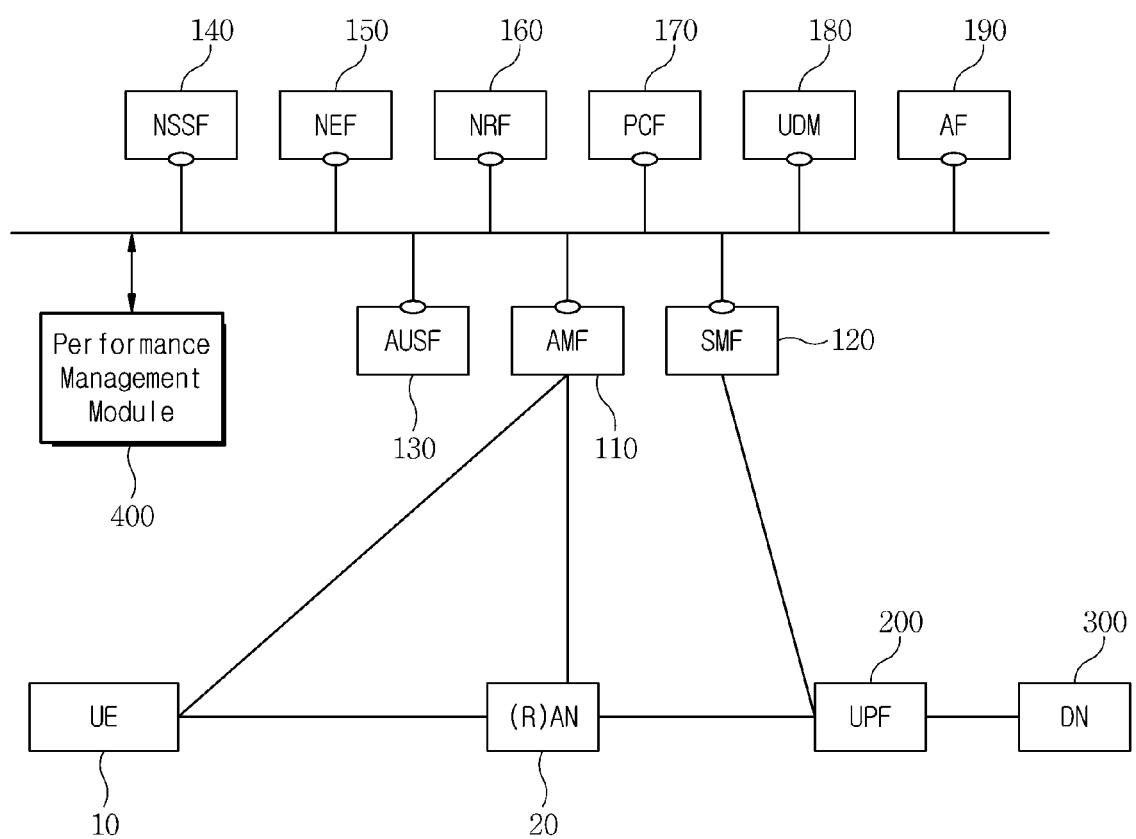
FIG. 1 is a diagram illustrating the configuration of a network system for controlling a sensor-based network access according to an embodiment of the present disclosure.

Hereinafter, embodiments of the present disclosure will be described in detail with reference to the accompanying drawings so that those of ordinary skill in the art to which the present disclosure pertains can easily implement the present disclosure. However, in the following description, well-known functions or configurations may not be described in detail to avoid obscuring the subject matter of the present disclosure. The embodiments described and illustrated herein are not intended to limit the technology disclosed in specific forms and should be understood to include various modifications, equivalents, and/or alternatives to corresponding embodiments.

In addition, when it is mentioned that a certain element is "connected to" or "coupled to" another element, it means that the element may be logically, electrically or physically connected to or coupled to another element. Namely, the element may be directly connected or coupled to another element, or a new element may exist between both elements.

Also, in this disclosure, the terms are merely used for describing particular embodiments but do not limit such embodiments. Singular forms are intended to include plural forms unless the context clearly indicates otherwise. Further, terms such as "comprise" or "include" used herein are intended to designate the presence of features, numbers, steps, operations, elements, components, or combinations thereof described herein, and do not preclude the possibility of the presence or addition of one or more other features, numbers, steps, operations, elements, components, or combinations thereof.

Now, embodiments of the present disclosure will be described in detail with reference to the drawings. The same reference numerals are used for elements having similar functions and operations throughout the drawings, and redundant descriptions thereof will be omitted. In addition, in order to avoid obscuring the subject matter of the present disclosure, well-known structures and devices may be omitted or shown in a block form centering on the core functions of each structure and device.

Figure 2:
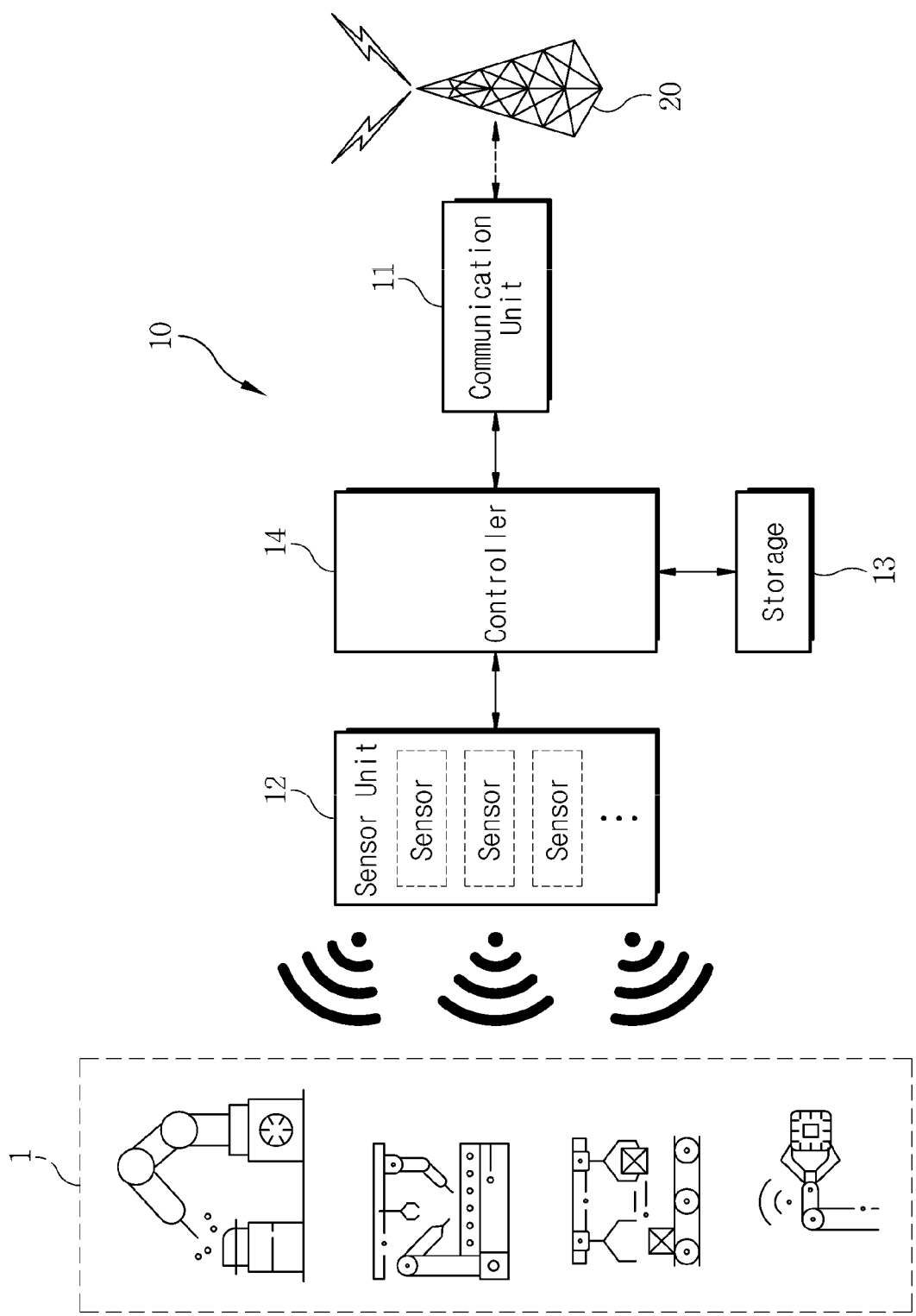
FIG. 2 is a diagram illustrating the configuration of a user equipment for controlling a sensor-based network access according to an embodiment of the present disclosure.

At the outset, the configuration of a network system for controlling a sensor-based network access according to an embodiment of the present disclosure will be described. FIG. 1 is a diagram illustrating the configuration of a network system for controlling a sensor-based network access according to an embodiment of the present disclosure. FIG. 2 is a diagram illustrating the configuration of a user equipment for controlling a sensor-based network access according to an embodiment of the present disclosure.

Referring to FIG. 1, a network system S1 according to an embodiment of the present disclosure basically includes a user equipment (UE) 10, a radio access device (RAN) 20, a plurality of network function (NF) modules 110 to 200 and 400, and a data network (DN) 300.

The UE 10 includes at least one sensor, and as long as it is a device having a communication function, its type is not limited. The RAN 20 wirelessly connects the UE 10 and the network.

The NF modules 110 to 200 and 400 include an access and mobility management function module (AMF) 110, a session management function module (SMF) 120, an authentication server function module (AUSF) 130, a network slice selection function module (NSSF) 140, a network exposure function module (NEF) 150, a network repository function module (NRF) 160, a policy control function module (PCF) 170, a unified data management module (UDM) 180, an application function module (AF) 190, a user plane function module (UPF) 200, and a performance management module 400. Each of the NFs 110 to 200 and 400 may be implemented in the form of independent modules distinguished by at least one of hardware and software. In the 5G, a network structure for supporting a user equipment, a base station (access), a core, and a server end-to-end is defined, and the function of control signaling and data transmission/reception, which were complexly performed by a single node (e.g., S-GW, P-GW, etc.) in the existing LTE (4G), is divided into a control signaling function (control plane) and a data transmission and reception function (user plane). Therefore, the NFs 110 to 200 and 400 may be classified according to a control plane and a user plane.

Network nodes of the control plane include the AMF 110, the SMF 120, the PCF 170, the AUSF 130, the NRF 160, the NEF 150, the NSSF 140, the AF 190, and the performance management module 400. In addition, data nodes of the user plane include the UPF 200 that transmits/receives data between the UE 10 and a server on a data network (e.g., Internet) through a session with the UE 10 based on the control (interoperation) of the SMF 120.

The AMF 110 performs an access control, mobility management, and network slice selection function. The SMF 120 performs a subscriber session setup and management function according to a network policy. The PCF 170 performs a policy control function corresponding to a network slice. The UPF 200 performs a function of transferring data traffic according to a service type in the user plane. The AUSF 130 performs a function of authenticating the UE 10 in a registration procedure of the UE 10. The UDM 180 performs a function of storing and managing subscriber data and subscriber profiles. The NRF 160 provides a registration and search function for discovery and communication between a plurality of network functions (NF). The NEF 150 performs a network exposure function. The NSSF 140 provides a network slice selection function. The AF 190 provides an application management function. The DN 300 represents an external data network.

The present disclosure provides a sensor-based network access. The sensor-based network access according to an embodiment of the present disclosure means that the UE 10 having been in an idle state is activated to perform a network access when a sensor value measured by the sensor satisfies a predetermined condition. In an embodiment of the present disclosure, a sensor that supports the sensor-based network access will be referred to as a permissible sensor.

The performance management module 400 stores information about the permissible sensor that includes a list of permissible sensors supporting the sensor-based network access and a permissible condition for allowing network access through the permissible sensor.

The list of permissible sensors contains identification information of at least one permissible sensor. The sensor identification information includes at least one of an identifier and a name of the sensor, and may further include a model name, a version, and the like of the sensor.

The permissible condition includes a permissible measurement scheme and a permissible sensor value. The measurement scheme includes a measurement period for measuring a sensor value, an event for triggering a measurement operation of the sensor, and a sampling technique for acquiring a measurement target sample. The sensor value may include a minimum value, a maximum value, an average value, a threshold value, a conditional operation (>, <=&, etc.), and priorities for a plurality of sensors. In addition, the sensor value may include not only numerical information, but also a cause such as "Cause=Critical, Major, Minor and OK, Not OK, Conditional OK".

An example of the permissible sensor information is shown in Table 1 below.

TABLE 1

| Sensor identifier | Sensor name | Sensor type | Model/version | Sensor threshold (min, max) | Sensor priority | Sensor cause/message |
|---|---|---|---|---|---|---|
| {8} | Pressure meter | Location | 'AXY', v0.9 | ... | ... | OK, NOK, COK |
| {7} | Accelerometer | Acceleration | ... | ... | ... | ... |
| {5} | Light meter | Light | ... | ... | ... | ... |
| ... | ... | ... | ... | ... | ... | ... |

The AF 190 may perform provisioning of permissible sensor information to the performance management module 400 through the NEF 150 or directly. The performance management module 400 is preferably, but limited to, a performance management function (PMF) and an application function (AF). That is, the performance management module 400 may be any node as long as it stores a mapping relation between a service and the permissible sensor information and, if necessary, provides it for search. All the components 10, 20, and 100 to 1100 of the network system S1 as described above may be interconnected through a plurality of interfaces to transmit/receive information. Particularly, in case of processing control signaling for the UE 10, a lot of signaling may be exchanged between respective NFs in order for each NF to perform a control function and process signaling. Meanwhile, referring to FIG. 2, the UE 10 includes a communication unit 11, a sensor unit 12, a storage 13, and a controller 14.

The communication unit 11 is a component for communication. The communication unit 11 is configured to transmit or receive data by accessing a network through the RAN 20. The communication unit 11 may include a radio frequency (RF) transmitter (Tx) for up-converting and amplifying the frequency of a signal to be transmitted, and an RF receiver (Rx) for low-noise amplifying a received signal and down-converting the frequency. In addition, the communication unit 11 may include a modem that modulates the signal to be transmitted and demodulates the received signal.

The sensor unit 12 includes at least one sensor. The sensor included in the sensor unit 12 may include a sensor that measures information about a specific object 1. An accelerometer for measuring acceleration ((x, y, z), $m/s^2$), a gyroscope for measuring angular velocity ((x, y, z) rad/s), and other sensors for measuring geomagnetic field ((x, y, z) uT), pressure (hPa), light (Lx), proximity, gravity ((x, y, z), $m/s^2$), linear acceleration ($m/s^2$), orientation (pitch, roll, azimuth), compass, temperature, and humidity may also be included. In addition, sensors for measuring information about the UE 10 itself may be included. These sensors measure battery level (mV), location information (e.g., GPS (latitude, longitude) information), I/O information (e.g., audio input, video input), motion detection information (e.g., vibration, radio frequency, infrared), and the like. According to an embodiment of the present disclosure, at least one sensor of the sensor unit 12 is set in accordance with the permissible sensor information provided by the AMF 110. Therefore, a permissible sensor among the sensors included in the sensor unit 12 performs measurement in accordance with a measurement scheme of a permissible condition in the permissible sensor information and, when a sensor value of the permissible condition is satisfied, transfers the sensor value to the controller 14.

The storage 13 stores programs and data necessary for the operation of the UE 10. In particular, the storage 13 may store a list of sensors possessed by the UE and the permissible sensor information. The list of sensors possessed by the UE 10 is a list of sensors included in the sensor unit 12 and includes identification information for identifying each sensor. The permissible sensor information stored in the storage 13 is information indicating a list of permissible sensors supporting sensor-based network access among the sensors possessed by the UE and a permissible condition for allowing network access through the permissible sensor. Various data stored in the storage 160 may be deleted, changed, or added in response to a user's manipulation.

The controller 14 may control the overall operation of the UE 10 and a signal flow between internal blocks of the UE 10 and may perform a data processing function. In addition, the controller 14 basically controls various functions of the UE 10. The controller 14 may be a central processing unit (CPU), a digital signal processor (DSP), or the like. The operation of the controller 14 will be described in detail below.

Figure 3:
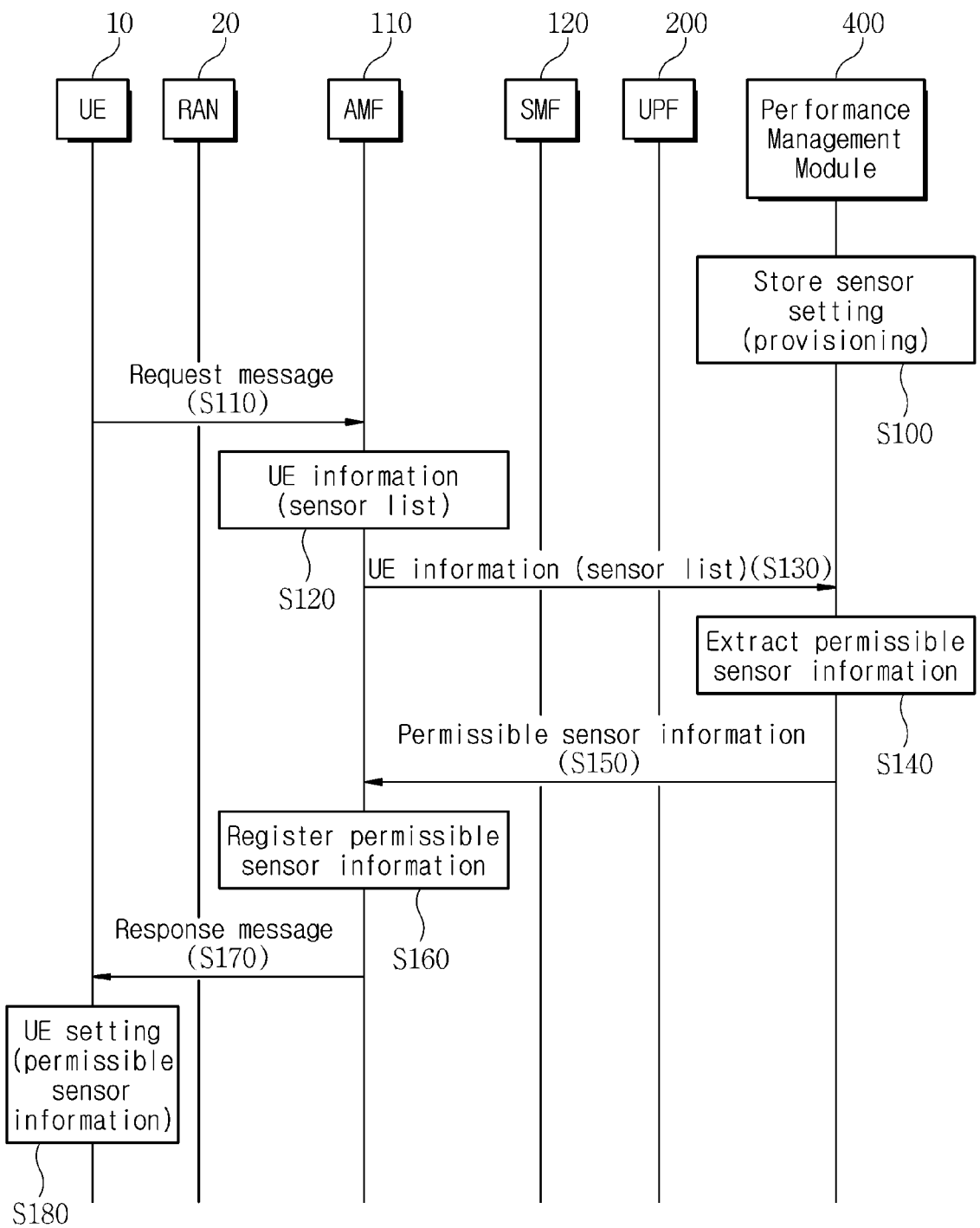
FIGS. 3 and 4 are flow diagrams illustrating a method for controlling a sensor-based network access according to an embodiment of the present disclosure.
Figure 4:
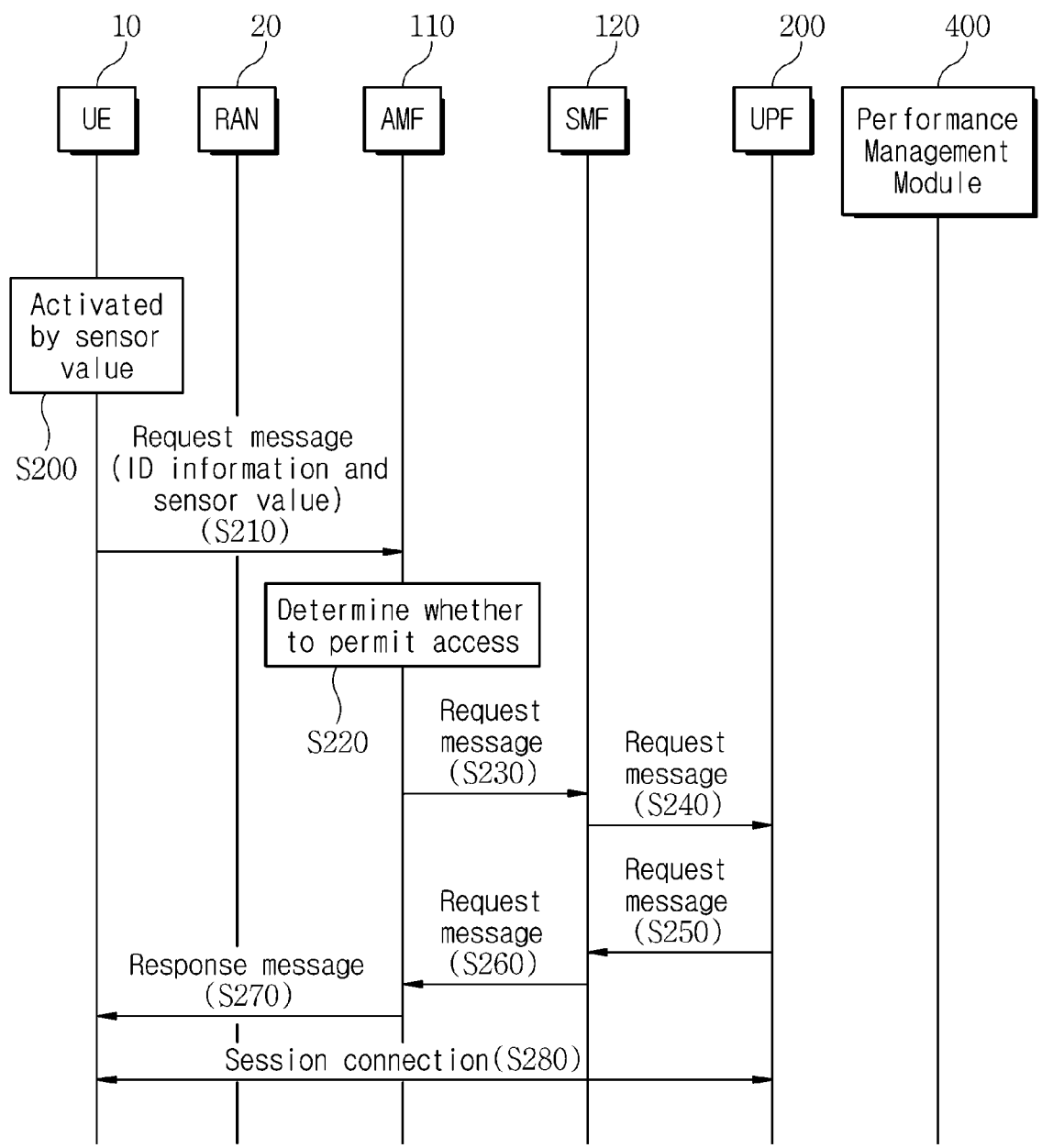

Now, a method for controlling a sensor-based network access according to an embodiment of the present disclosure will be described. FIGS. 3 and 4 are flow diagrams illustrating a method for controlling a sensor-based network access according to an embodiment of the present disclosure.

First, referring to FIG. 3, the performance management module 400 stores a plurality of services (slices) and permissible sensor information corresponding to the plurality of services at step S100. The permissible sensor information includes a list of permissible sensors supporting sensor-based network access and a permissible condition indicating a condition for allowing network access through the permissible sensor. Here, the AF 190 may access the performance management module 400 directly or through the NEF 150 and perform provisioning of the permissible sensor information to the performance management module 400.

At step S110, the UE 10 transmits a request message including a list of at least one sensor included in the sensor unit 120 of the UE 10 and UE information. Upon receiving the request message, the AMF 100 registers the UE information at step S120. At this step, in order to register the UE information, authentication may be performed using a UE identifier through the AUSF 130.

Meanwhile, at step S130, the AMF 100 transmits the UE information including the UE's sensor list to the performance management module 400. At step S140, the performance management module 400 receiving the UE information extracts, from the permissible sensor information provisioned earlier (step S100), permissible sensor information corresponding to the sensor list transmitted by the AMF 100. That is, the performance management module 400 extracts permissible sensor information including the list of permissible sensors supporting sensor-based network access among the sensors of the UE and a permissible condition for allowing network access through the permissible sensor.

Then, at step S150, the performance management module 400 transmits the extracted permissible sensor information to the AMF 110.

At step S160, the AMF 110 stores the permissible sensor information received from the performance management module 400 by mapping it to the UE information received from the UE 10. Then, at step S170, the AMF 110 transmits the permissible sensor information to the UE 10 so that the permissible sensor among the sensors of the UE 10 is set in accordance with the permissible sensor information. At this step, the AMF 110 may transmit, together with the permissible sensor information, an indicator that enables the UE 10 to operate only in an idle mode in accordance with the permissible sensor information.

Upon receiving the permissible sensor information, the controller 14 of the UE 10 performs setting in accordance with the permissible sensor information at step S180. Accordingly, the plurality of sensors of the sensor unit 12 operate in accordance with the permissible sensor information. That is, the permissible sensor among the plurality of sensors in the sensor unit 120 of the UE 10 performs measurement in accordance with a measurement scheme of the permissible sensor information, and only when a measured sensor value matches the sensor value of the permissible sensor information, the controller 14 of the UE 10 is activated to access the network or request a service. Also, in case of receiving the indicator, the UE 10 may operate in accordance with the permissible sensor information in the idle state.

Next, referring to FIG. 4, after the setting is performed in accordance with the permissible sensor information as described above, if the sensor value measured in accordance with the measurement scheme of the permissible sensor information by the permissible sensor among the plurality of sensors of the sensor unit 120 satisfies the sensor value of the permissible sensor information, the controller 14 of the UE 10 is activated at step S200 and transmits a request message including identification information of the corresponding sensor and the sensor value at step S210. Here, the request message includes NAS messages, that is, all N1/N2 messages corresponding to 5GMM (Mobility Management) and 5GSM (Session Management).

Then, the AMF 110 checks whether the identification information of the sensor and the sensor value satisfy the permissible condition through comparison with the permissible sensor information previously registered (step S160). At this step, it is assumed that the sensor value satisfies the permissible condition. Then, the AMF 110 permits the access of the UE 10. In addition, the AMF 110 provides a necessary service to the UE 10 in accordance with the request message.

For example, if the request message is a session (PDU session) connection, the AMF 110 transmits the request message to the SMF 120 at step S230. Then, the SMF 120 may transmit the request message to the UPF 200. In response to this, the UPF 200 transmits a response message at step S250, and this response message may be provided to the UE 10 through the SMF 120 and the AMF 110 at steps S260 and S270. Accordingly, the controller 14 of the UE 10 performs a session connection through the UPF 200 at step S280.

Figure 5:
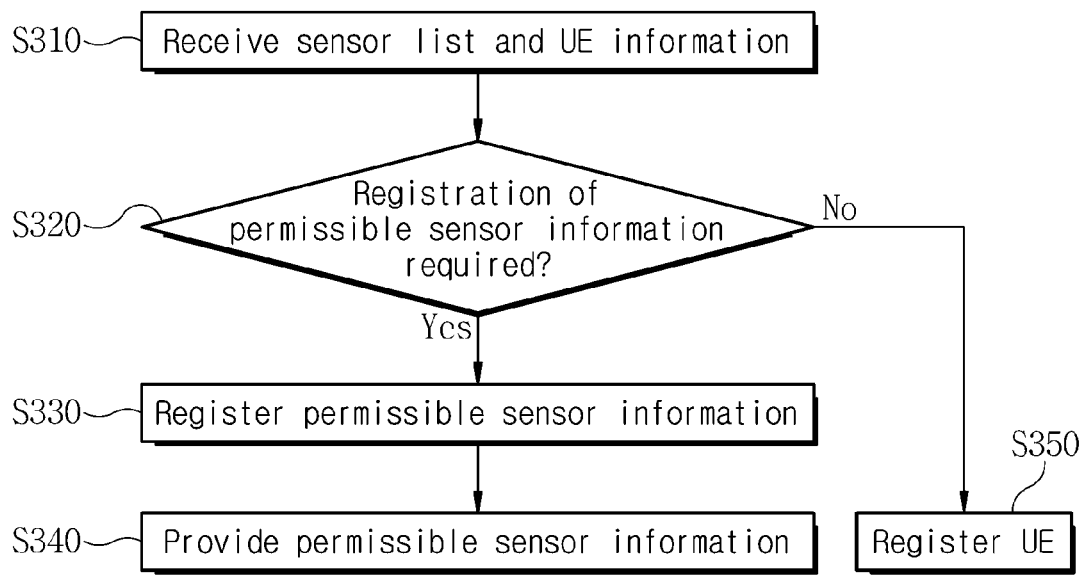
FIG. 5 is a flow diagram illustrating a sensor registration procedure according to an embodiment of the present disclosure.

Next, a sensor registration procedure as described above will be described in detail. FIG. 5 is a flow diagram illustrating a sensor registration procedure according to an embodiment of the present disclosure.

Referring to FIG. 5, at step S310, the AMF 110 may receive a list of at least one sensor included in the sensor unit 12 of the UE 10 and UE information through a request message from the UE 10.

Then, at step S320, the AMF 110 determines whether registration of permissible sensor information corresponding to the UE is required. At this step, the AMF 110 provides UE information including the list of sensors possessed by the UE 10 to the performance management module 400 and, upon receiving permissible sensor information corresponding to the list of sensors possessed by the UE 10 from the performance management module 400, determines that registration of the permissible sensor information is required. On the other hand, if there is no permissible sensor information corresponding to the list of sensors possessed by the UE 10, the performance management module 400 determines that registration of the permissible sensor information is necessary.

If it is determined at the step S320 that registration of the permissible sensor information is required, the AMF 110 registers the permissible sensor information together with the UE information at step S330. That is, the UE information and the permissible sensor information are mapped to each other and stored. Subsequently, at step S340, the AMF 110 provides the permissible sensor information to the UE 10 through a response message so that the UE 10 is set in accordance with the registered permissible sensor information. On the other hand, if it is determined at the step S320 that registration of the permissible sensor information is not required, the AMF 110 registers only the UE information at step S350 and then transmits a response message to the UE 10.

Upon receiving the permissible sensor information through the communication unit 11, the controller 14 of the UE 10 sets the sensor unit 12 to operate in accordance with the received permissible sensor information.

Figure 6:
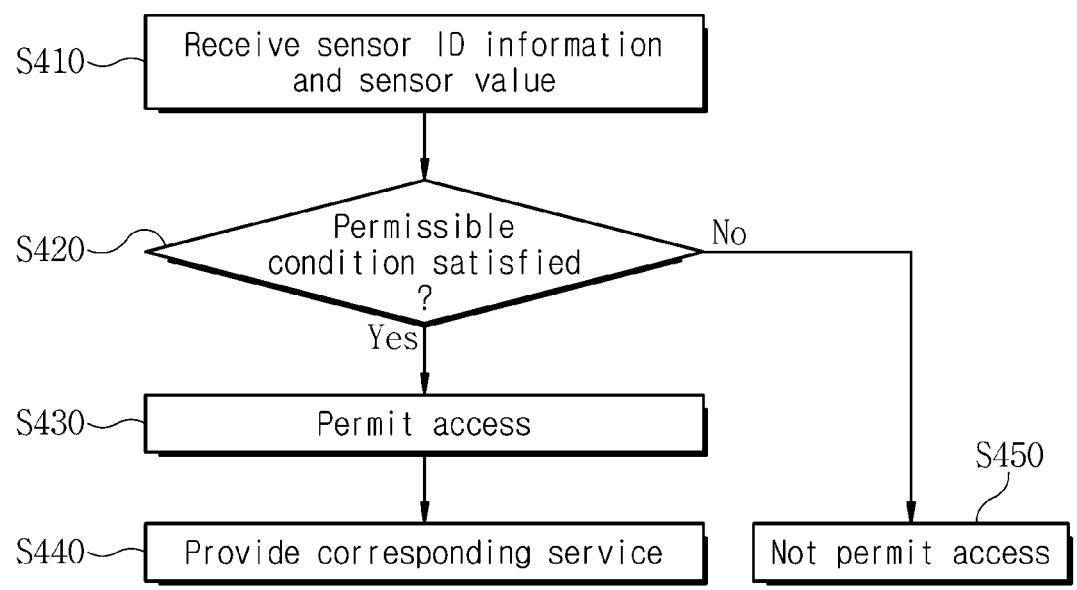
FIG. 6 is a flow diagram illustrating a method for controlling a sensor-based network access according to an embodiment of the present disclosure.

Now, a method for controlling sensor-based network access after registering the permissible sensor information as described above will be described. FIG. 6 is a flow diagram illustrating a method for controlling a sensor-based network access according to an embodiment of the present disclosure.

Referring to FIG. 6, a permissible sensor among a plurality of sensors in the sensor unit 12 of the UE 10 performs measurement in accordance with a measurement scheme of permissible sensor information. The measurement scheme includes a measurement period for measuring a sensor value, an event for triggering a measurement operation of the sensor, and a sampling technique for acquiring a measurement target sample. As a result of this measurement, if a measured value of the corresponding sensor satisfies a sensor value of the permissible sensor information, the controller 14 transmits a request message including identification information of the sensor and the sensor value through the communication unit 11. This request message is transmitted to the AMF 110 through the RAN 20. Therefore, at step S410, the AMF 110 may receive the sensor identification information and the sensor value from the UE 10 through the request message. For example, the request message may be a session connection request message.

At step S420, the AMF 110 compares the sensor identification information and the sensor value with previously registered permissible sensor information and thereby determines whether a permissible condition is satisfied.

If it is determined at the step S420 that the permissible condition is satisfied, the AMF 110 permits the access of the UE 10 at step S430. Then, at step S440, the AMF 110 provides a service corresponding to the request message. For example, when the request message is a session connection request message, a session connection procedure may be performed through message exchange with other NFs 120 to 200. Also, in response to the session connection request message, a session connection response message including information on the UPF 200 required for session connection may be transmitted to the UE 10.

On the other hand, if it is determined at the step S420 that the permissible condition is not satisfied, the AMF 110 does not permit the access of the UE 10 at step S440.

The sensor-based network access control method according to an embodiment of the present disclosure may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure may be easily deduced or altered by programmers in the art to which the present disclosure belongs.

Although embodiments to illustrate the technical subject matter of the present disclosure are described above, the present disclosure is not limited to the configuration and operation of such embodiments, and various changes and modifications to the present disclosure can be made as well understood by those skilled in the art without departing from the technical subject matter. Accordingly, all such appropriate changes and modifications and their equivalents should be considered to be within the scope of the present disclosure.

According to the present disclosure, network access of the UE is permitted only when necessary by using the permissible sensor information for setting the access permissible condition based on the sensor value of at least one sensor possessed by the UE. This can prevent unnecessary resource use. The present disclosure has a good possibility of sales on the market or business and therefore has industrial applicability suitable for practical and apparent implementation.

What is claimed is:

1. An apparatus for controlling network access, comprising:
   an access and mobility management function module (AMF) providing, to a user equipment (UE), information about permissible sensors supporting a sensor-based network access from among sensors possessed by the UE; and
   a performance management module storing the permissible sensor information,
   wherein the AMF is configured to:
   upon receiving a list of the sensors possessed by the UE from the UE,
   extract, from the performance management module, the permissible sensor information including a list of the permissible sensors and a permissible condition for permitting network access through the permissible sensors.

2. The apparatus of claim 1, wherein the AMF is further configured to:
   upon receiving a sensor value and identification information of at least one sensor through a request message from the UE,
   determine whether the sensor value and the identification information of the sensor satisfy the permissible condition, and
   permit an access of the UE when determining that the permissible condition is satisfied.

3. The apparatus of claim 1, wherein the permissible condition includes a sensor value in which the network access through permissible sensor is permitted.

4. The apparatus of claim 1, wherein the permissible condition includes a measurement scheme in which the permissible sensor measures a sensor value.

5. The apparatus of claim 1, wherein the AMF transmits, to the UE, an indicator that enables the UE to operate in an idle mode in accordance with the permissible sensor information.

6. The apparatus of claim 1, further comprising:
   an application function module (AF) that performs provisioning of the permissible sensor information to the performance management module directly or through a network exposure function module (NEF).

7. A method for controlling network access, comprising:
   at an access and mobility management function module (AMF), receiving a list of sensors possessed by a user equipment (UE) from the UE;
   at the AMF, extracting, from a performance management module, permissible sensor information that includes a list of permissible sensors supporting a sensor-based network access from among the sensors possessed by the UE and a permissible condition for permitting network access through the permissible sensors; and
   at the AMF, transmitting the permissible sensor information to the UE so that the sensors possessed by the UE are set in accordance with the permissible sensor information.

8. The method of claim 7, further comprising:
   after transmitting the permissible sensor information to the UE,
   receiving a sensor value and identification information of at least one sensor through a request message from the UE;

determining whether the sensor value and the identification information of the sensor satisfy the permissible condition; and at the AMF, permitting an access of the UE when determining that the permissible condition is satisfied.

9. The method of claim 7, wherein the permissible condition includes a sensor value in which the network access through permissible sensor is permitted.

10. The method of claim 7, wherein the permissible condition includes a measurement scheme in which the permissible sensor measures a sensor value.

11. The method of claim 7, wherein transmitting the permissible sensor information to the UE includes transmitting an indicator that enables the UE to operate in an idle mode in accordance with the permissible sensor information.

12. The method of claim 7, further comprising:
before receiving the list of sensors possessed by the UE,
at an application function module (AF), performing provisioning of the permissible sensor information to the performance management module directly or through a network exposure function module (NEF).

* * * * *